US011686643B2

(12) United States Patent
Eckerstroem et al.

(10) Patent No.: US 11,686,643 B2
(45) Date of Patent: Jun. 27, 2023

(54) ARRANGEMENT AND METHOD FOR OBTAINING A QUANTITY RELATED TO A TEMPERATURE ALONG A PART OF AN OPTICAL FIBRE

(71) Applicant: SAAB AB, Linkoeping (SE)

(72) Inventors: Daniel Eckerstroem, Bankeryd (SE); Mats Forselius, Joenkoeping (SE); David Esselius, Huskvarna (SE)

(73) Assignee: SAAB AB, Linköping (SE)

( * ) Notice: Subject to any disclaimer, the term of this patent is extended or adjusted under 35 U.S.C. 154(b) by 272 days.

(21) Appl. No.: 17/247,753

(22) Filed: Dec. 22, 2020

(65) Prior Publication Data
US 2021/0215566 A1 Jul. 15, 2021

(30) Foreign Application Priority Data
Jan. 15, 2020 (SE) .................................... 2050029-4

(51) Int. Cl.
*G01M 3/04* (2006.01)
*G01K 11/3206* (2021.01)
*G02B 6/02* (2006.01)

(52) U.S. Cl.
CPC ........... *G01M 3/04* (2013.01); *G01K 11/3206* (2013.01); *G02B 6/02076* (2013.01)

(58) Field of Classification Search
CPC ........... G01K 11/3206; G01K 11/3213; G01K 11/125; G01K 11/00
See application file for complete search history.

(56) References Cited

U.S. PATENT DOCUMENTS 4,298,794 A * 11/1981 Snitzer ................. G02B 6/4439
374/161
5,308,162 A * 5/1994 Amano ................. G01M 3/002
385/12

(Continued)

FOREIGN PATENT DOCUMENTS

CA 2968996 A1 6/2016
CN 106768270 A 5/2017
(Continued)

OTHER PUBLICATIONS

European Patent Office, Extended European Search Report received for Application No. 20212849.2, dated May 21, 2021, 7 pages, Germany.

(Continued)

*Primary Examiner* — David A. Rogers
(74) *Attorney, Agent, or Firm* — Alston & Bird LLP (57) ABSTRACT

The present disclosure relates to an arrangement (100) for obtaining a quantity related to a temperature along a part of an optical fibre (110). The arrangement comprises a light emitter (120) arranged to emit light into the optical fibre (110). The optical fibre is at at least one location along said part of the optical fibre provided with a Fibre Bragg Gratings, FBGs (111, 112, 113), wherein the FBGs are arranged to reflect light within a predetermined wavelength range. The arrangement further comprises a detector (160) arranged to receive and detect the reflected light, a first optical shutter (130) arranged in the optical path after the light emitter. The first optical shutter is arranged to be opened and closed in order to let the emitted light through and into the optical fibre (110), a second optical shutter (150) arranged to be opened and closed in order to let the reflected light through, and an optical circulator (140) having a first, a second and a third port. The optical circulator is operatively connected to the first optical shutter (130) at the first (Continued)

port, to the part of the optical fibre provided with the FBGs (111, 112) at the second port, and to the second optical shutter (150) at the third port. A control unit (180) is arranged to control the first optical shutter (130) and the second optical shutter (150). The control unit (180) is arranged to coordinate the timing of the opening of the first optical shutter (130) and the second optical shutter (150), respectively.

16 Claims, 5 Drawing Sheets

(56) References Cited

U.S. PATENT DOCUMENTS

| | | | |
|---|---|---|---|
| 5,680,489 A | 10/1997 | Kersey | |
| 6,945,692 B2* | 9/2005 | Dammann | B64D 45/00 |
| | | | 374/161 |
| 7,593,647 B2* | 9/2009 | Lee | H04B 10/572 |
| | | | 398/198 |
| 9,062,965 B2 | 6/2015 | Yoshida et al. | |
| 10,247,584 B2* | 4/2019 | Crickmore | G01D 5/35361 |
| 10,495,525 B2* | 12/2019 | Dong | G01D 5/268 |
| 10,656,041 B2* | 5/2020 | Hadley | G01M 3/002 |
| 10,725,360 B2* | 7/2020 | Lukens | G02F 1/3544 |
| 11,002,594 B2* | 5/2021 | Ma | G02B 26/04 |
| 2002/0025097 A1 | 2/2002 | Cooper et al. | |
| 2010/0002983 A1* | 1/2010 | Kopp | G01M 3/047 |
| | | | 385/12 |
| 2013/0140445 A1 | 6/2013 | Yoshida et al. | |
| 2014/0152995 A1 | 6/2014 | Dong et al. | |
| 2015/0088346 A1 | 3/2015 | Lee | |
| 2017/0074688 A1* | 3/2017 | Crickmore | G01K 11/3206 |
| 2017/0334574 A1* | 11/2017 | Wilson | G02B 6/4266 |
| 2018/0252575 A1* | 9/2018 | Wang | E21B 47/135 |
| 2019/0025094 A1* | 1/2019 | Lewis | G01D 5/35361 |
| 2019/0025095 A1* | 1/2019 | Steel | G01D 5/35383 |
| 2019/0101419 A1* | 4/2019 | Rowen | G01K 11/32 |
| 2020/0249075 A1* | 8/2020 | Ma | G02B 26/04 |
| 2022/0412821 A1* | 12/2022 | Jaaskelainen | G01K 11/322 |

FOREIGN PATENT DOCUMENTS

| | | | |
|---|---|---|---|
| CN | 114088241 A * | 2/2022 | |
| JP | 08-145736 A | 6/1996 | |
| JP | 2013-113830 A | 6/2013 | |
| WO | WO 2015/199590 A1 | 12/2015 | |
| WO | WO-2017087792 A1 * | 5/2017 | G01D 5/35361 |

OTHER PUBLICATIONS

Swedish Patent and Registration Office, Search Report for Application No. 2050029-4, dated Jun. 15, 2020, 2 pages, Sweden.

* cited by examiner

ARRANGEMENT AND METHOD FOR OBTAINING A QUANTITY RELATED TO A TEMPERATURE ALONG A PART OF AN OPTICAL FIBRE

CROSS-REFERENCE TO RELATED APPLICATIONS

This application claims priority to Swedish Application No. 2050029-4 filed Jan. 15, 2020, the contents of which are hereby incorporated herein in its entirety by reference.

TECHNICAL FIELD

The present disclosure relates to an arrangement and method for obtaining a quantity related to a temperature along a part of an optical fibre. The disclosure also relates to a system and a platform comprising such arrangement.

BACKGROUND

Temperature monitoring in platforms is of interest for example in order to detect hot gas leakage of gas pipes, such as bleed air ducts in aircrafts.

Typically, temperature monitoring is performed by monitoring changes of the electrical resistance of a temperature sensor. In one example, temperature monitoring is performed by an electrical cable comprising a salt. When the temperature increases above a certain threshold, the salt melts which in turn causes a short-circuit in the electrical cable. The short-circuit may thereby be indicative of a temperature increase due to hot gas leakage. A disadvantage of such a temperature sensor is that time-consuming troubleshooting is required in order to determine where the leakage has occurred.

It is also known to measure temperature changes by optical fibre comprising Fibre Bragg Gratings, FBGs. An example of an optical fibre sensor system for detecting temperature changes is disclosed in WO 2015/199590 A1. In such a system, a plurality of FBGs are inscribed along a part of the optical fibre. Each FBG is active in its particular wavelength range within the electromagnetic spectrum and reflects light of a certain narrow wavelength band, within the particular wavelength range, depending on the temperature. The reflected narrow wavelength band has a peak at the Bragg wavelength. A temperature change results in a shift of the Bragg wavelength.

There is need for an improved arrangement for obtaining a quantity related to a temperature along a part of an optical fibre comprising FBGs.

SUMMARY OF THE INVENTION

An object of the present disclosure is to provide a solution for obtaining a quantity related to temperature wherein some of the problems with prior art technologies are mitigated or at least alleviated.

The disclosure proposes an arrangement for obtaining a quantity related to a temperature along a part of an optical fibre. The arrangement comprises a light emitter arranged to emit light into the optical fibre. The optical fibre is at at least one location along said part of the optical fibre provided with a Fibre Bragg Gratings, FBGs, the FBGs being arranged to reflect light within a predetermined wavelength range. The arrangement also comprises a detector arranged to receive and detect the reflected light. The arrangement also comprises a first optical shutter arranged in the optical path after the light emitter, the first optical shutter being arranged to be opened and closed in order to let the emitted light through and into the optical fibre and a second optical shutter arranged to be opened and closed in order to let the reflected light through. The arrangement also comprises an optical circulator having a first, a second and a third port. The optical circulator is operatively connected to the first optical shutter at the first port, to the part of the optical fibre provided with the FBGs at the second port, and to the second optical shutter at the third port, and a control unit arranged to control the first optical shutter and the second optical shutter. The control unit is arranged to coordinate the timing of the opening of the first optical shutter and the second optical shutter, respectively.

Optical fibres comprising FBGs offer remote temperature monitoring without electric wiring. The optical fibre comprising the FBGs is unaffected by electric fields and magnetic fields and does not suffer from many of the common drawbacks of electronic sensors for temperature monitoring. For this reason, one advantages of fibre optical sensor systems using FBGs is that it has a reliable performance and flexible positioning of the proposed arrangement along an object of which the temperature should be monitored.

Due to the small weight of optical fibre, the proposed arrangement has a relatively small weight.

By the arrangement, monitoring of temperature change trends is enabled, relating to small leakages of hot gas, thereby it is possible to schedule maintenance in advance and shutdown periods, for example of an aircraft due to leakage, is reduced.

By the proposed arrangement it is possible to control the timing for opening and closing of the first optical shutter and the second optical shutter. By controlling the timing for opening and closing of the first optical shutter and the second optical shutter it is possible to control the arrangement such that no reflections from a plurality of locations of the optical fibre is obtained simultaneously. Simultaneous reflections from a plurality of locations gives an undesired mix of signals from different FBGs originating from light emitted into the optical fibre at different times. Thereby, no delay line, i.e. an optical fibre, between the detector and the first FBG is needed in this arrangement. The delay line is an extension of the optical fibre which has at least the same length as the extension of FBGs in the optical fibre. The delay line may be positioned between the first FBG and the optical circulator, and/or between the optical circulator and the second optical shutter and/or between the second optical shutter and the detector.

By the configuration with two optical shutters and the possibility of coordination of the timing of the opening and closing of the first optical shutter and the second optical shutter, the signal-to-noise relation is improved as compared to prior art systems. One reason for the improved signal-to-noise ratio is that light from the first optical shutter is not mixed with the reflected light from the FBGs.

Since the arrangement may comprise a plurality of FBGs, it is possible to monitor the temperature at a plurality of locations along the optical fibre.

According to some aspects, the first optical shutter and/or the second optical shutter is further arranged to amplify at least a first wavelength of the light passing through the first shutter and/or at least said first wavelength of the light passing through the second shutter.

By amplification of at least a first wavelength of the light passing through the first optical shutter and/or the at least first wavelength of the light passing through the second optical shutter, the signal-to-noise ratio may be improved even further. By amplification of at least a first wavelength of the light passing through the first optical shutter, the need for amplification by the second optical shutter may be decreased.

According to some aspects, the first optical shutter comprises the light emitter.

According to some aspects, the first optical shutter and the second optical shutter are controlled by the control unit such that the first optical shutter and the second optical shutter are opened simultaneously.

According to some aspects, the first optical shutter and the second optical shutter are controlled by the control unit such that the second optical shutter is opened with a time delay as compared to when the first optical shutter is opened.

The time delay is chosen such that it corresponds to the time-of-flight for the light to travel from the first optical shutter until the light reflected by the FBG reaches the second optical shutter. By the time delay, the optical fibre from the detector to the first FBG does not need to be longer than the distance between the first and the last FBG (which is the case of simultaneously opening/closing of the first optical shutter and the second optical shutter 150 in order to not get reflected light from an adjacent FBG simultaneously as reflected light from the double distance). Hence, by the time delay, the signal-to-noise ratio is improved.

According to some aspects, the arrangement further comprising a processor operatively connected to the detector, said processor being arranged to process the detected light in order to determine the quantity related to temperature, such as a temperature of the optical fibre.

According to some aspects, the processor is further arranged to determine a location along the optical fibre from which the detected light has been reflected.

By the arrangement according to the present disclosure, it is possible to determine the location of a temperature change with an accuracy of about a few centimetres along the optical fibre. Thereby the amount of trouble-shooting is reduced in order to determine the location of a temperature change due to for example a gas leakage.

By the arrangement according to the present disclosure it is thus possible determine a temperature change or an absolute temperature at a specific location along the optical fibre and/or along the object to be monitored.

According to some aspects, the arrangement further comprises a user interface operatively connected to the detector and/or the processor, said user interface being arranged to present information relating to the temperature along a part of the optical fibre.

The user interface may be tailor-made to fit a specific application and/or apparatus to be monitored. For example, in a platform, such as an aircraft, the temperature can be monitored through a whole flight.

According to some aspects, the first optical shutter and/or the second optical shutter is a semiconductor optical amplifier, SOA.

According to some aspects, the light emitter is a superluminescent diode or a laser emitting device.

The present disclosure also relates to a system for detecting gas leakage from a gas pipe, said system comprising an arrangement and said gas pipe.

By monitoring a temperature change along a part of an optical fibre, it is possible to detect leakage from a gas pipe, since a temperature change may be related to a leakage.

The present disclosure also relates to a platform comprising an arrangement.

According to some aspects, the platform comprises a gas pipe arranged to carrying hot gas and wherein the part of the optical fibre provided with the FBGs is arranged along the gas pipe.

The arrangement is flexible since the optical fibre comprising FBGs can be arranged along the gas pipe to be monitored.

The present disclosure also relates to a method for obtaining a quantity related to a temperature along at least a part of an optical fibre, by means of an arrangement, the arrangement comprising a light emitter, a detector, a first optical shutter, a second optical shutter, a control unit and an optical circulator. The method comprises emitting light by the light emitter into the optical fibre, the optical fibre being provided with Fibre Bragg Grating, reflecting light within a predetermined wavelength range by the FBGs, receiving the reflected light by the detector, obtaining, based on the reflected light received by the detector, a quantity related to temperature. The control unit is arranged to coordinate the timing of the opening and closing of the first optical shutter and of the second optical shutter in order to let light through. The method corresponds to the actions performed by the arrangement as discussed above and have all the associated effects and advantages of the disclosed arrangement.

The present disclosure also relates to a computer program product comprising a non-transitory computer-readable storage medium having thereon a computer program comprising program instructions. The computer program being loadable into a processor and configured to cause the processor to carry out steps of a method for obtaining a quantity related to a temperature along at least a part of an optical fibre. The method comprises the steps of emitting light by the light emitter into the optical fibre, the optical fibre being provided with Fibre Bragg Grating, reflecting light within a predetermined wavelength range by the FBGs, receiving the reflected light by the detector, obtaining, based on the reflected light received by the detector, a quantity related to temperature. The control unit is arranged to coordinate the timing of the opening and closing of the first optical shutter and of the second optical shutter in order to let light through.

DETAILED DESCRIPTION

Figure 1:
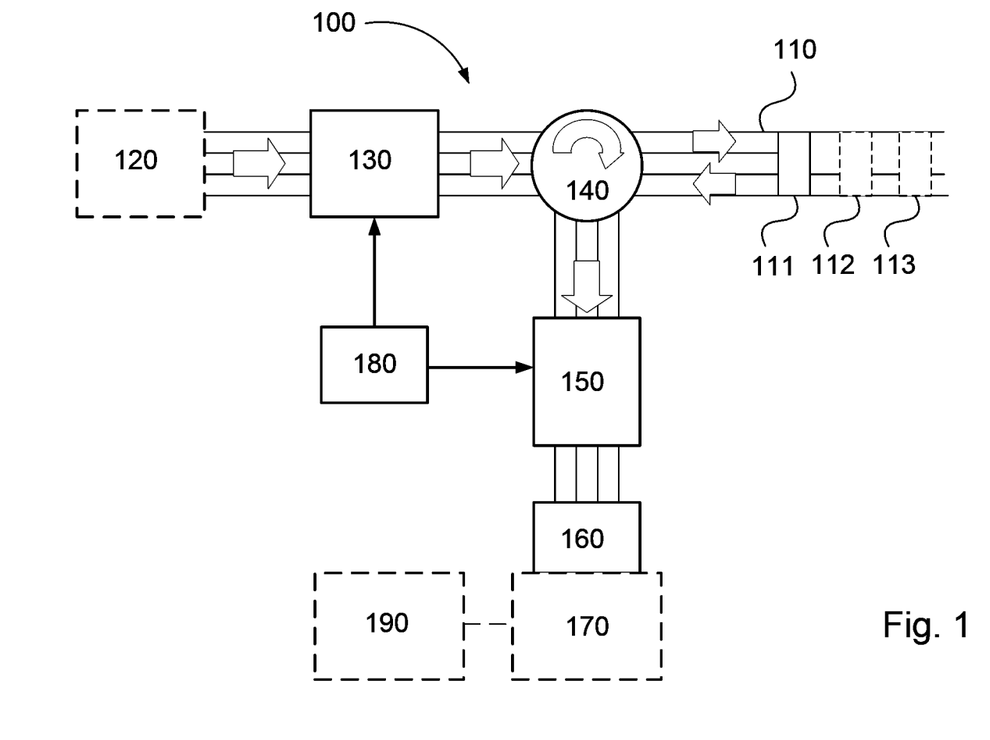
FIG. 1 schematically illustrates an arrangement according to the present disclosure.

FIG. 1 schematically illustrates an arrangement 100 for obtaining a quantity related to a temperature along a part of an optical fibre 110 according to the present disclosure. The arrangement comprises an optical fibre 110 provided with a Fibre Bragg Gratings, FBGs, 111, 112, 113 at at least one location along the optical fibre 110. The FBGs are each configured to reflect a predetermined wavelength during operational conditions. The arrangement further comprises a light emitter 120, a first optical shutter 130, an optical circulator 140, a second optical shutter 150, a detector 160 and a control unit 180. The arrangement may further comprise a processor 170 and/or a user interface 190.

The light emitter 120 is arranged to transmit light comprising at least those wavelengths which the Fibre Bragg Gratings are configured to reflect during operational conditions. The detector is arranged to receive the reflected light. Optionally, the processor 170 is arranged to process the data to determine a temperature of the optical fibre 110. In addition, the processor may be arranged to determine a location of said temperature of the optical fibre.

During operational conditions, the light emitter 120 is arranged to emit light into the optical fibre 110. When light is emitted into the optical fibre, the light first enters the first optical shutter 130. The first optical shutter is arranged to be opened (and closed) at a specific timing which is coordinated with the second optical shutter 150. The first optical shutter 130 may further be able to amplify light of a specific wavelength range. When the first optical shutter 130 is opened, the light passes through the first optical shutter 130 and enters the optical circulator 140. As will be described in detail below, the optical circulator 140 is provided with three ports. The light from the first optical shutter 130 enters the first port of the optical circulator and exits the optical circulator 140 at the second port. The light then travels through the optical fibre 110. When light of a wavelength corresponding to a FBG's active wavelength reaches said FBG the light is reflected back towards the optical circulator 140. The reflected light enters the second port of the optical circulator 140 and exits the third port of the optical circulator 140. The light then enters the second optical shutter 150. The second optical shutter 150 may further be able to amplify light of a specific wavelength range. When the second optical shutter 150 is opened, the light is let through the second optical shutter 150 and enters the detector 160. The detector 160 is arranged to detect the light let through the second optical shutter. The light detected by the detector 160 indicates a quantity related to a temperature along the part of the optical fibre 110 where the light was reflected. The narrow wavelength band of the reflected light has a peak at the Bragg wavelength. A temperature change, i.e. a temperature increase or temperature decrease results in a shift of the Bragg wavelength. In addition, as will be discussed below, it may also be possible to determine an absolute temperature.

The arrangement 100 comprises a control unit 180 which is arranged to control the first optical shutter 130 and the second optical shutter 150 in order to coordinate opening and closing of the first optical shutter 130 and the second optical shutter 150, respectively. The control unit 180 as well as the coordination of the first optical shutter 130 and the second optical shutter 150 will be described more in detail below.

As mentioned above, by the detector a quantity related to a temperature along the part of the optical fibre 110 where the light was reflected is detectable. However, by processing of the signal received by the detector, it is possible to also obtain additional information. Hence, the arrangement 100 may optionally comprise a processor 170 which may be arranged to determine a temperature and possibly also a location of the determined temperature along the optical fibre 110. The processor 170 will be described more in detail below. Further, the arrangement 100 may optionally comprise a user interface 190 arranged to present information relating to the temperature along a part of the optical fibre 110. The user interface will be described more in detail below.

Figure 2:
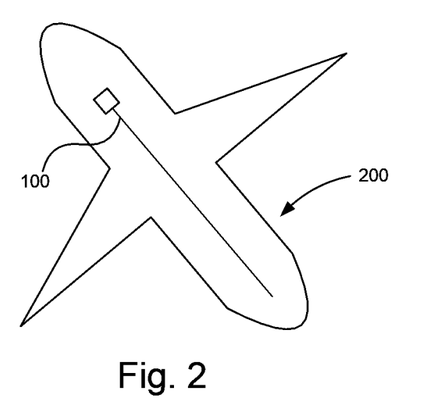
FIG. 2 schematically illustrates a platform comprising an arrangement according to the present disclosure.

FIG. 2 schematically illustrates an example of a platform 200. The platform 200 comprises the proposed arrangement 100 for obtaining a quantity related to temperature along a part of the optical fibre. According to the example shown in FIG. 2, the platform 200 is an aircraft. The aircraft may be a commercial civil aircraft or a military aircraft. The aircraft may be any type of aircraft, such as a helicopter. As an alternative, the platform 200 may be a land vehicle such as a tractor with a trailer, a truck, a bus, a car or a train. As a further alternative, the platform 200 may be a watercraft, such as motorboat, steamer, ferry or ship. As a further alternative, the platform 200 may be a stationary facility, such as an apartment complex, house or office building. The platform 200 may comprise one or a plurality of arrangements 100 according to the present disclosure in order to obtaining a quantity relating to temperature at one or a plurality of locations of the platform 200. The one or a plurality of arrangements 100 may be arranged to monitor one or more objects at the platform 200, such as one or more gas pipes. In one example, the plurality of arrangements 100 may be independently arranged at the platform. As a further example, it may be possible to link a plurality of such arrangements 100 together, which will be discussed in more detail with reference to FIG. 5 below.

The arrangement 100 is arranged to monitor a quantity relating to temperature, such as a temperature increase, a temperature decrease or an absolute temperature. The temperature increase or decrease may be indicative of malfunctioning parts or systems in the platform. For example, the arrangement 100 may be arranged to monitor that the temperature does not exceeds certain threshold value. Alternatively, the arrangement may be arranged to monitor that the temperature do not fall below a certain threshold value, for example the freezing temperature. In one example, wherein the arrangement is arranged to monitor a gas pipe, such as a bleed air duct, arranged to transport hot gas, a temperature increase may be related to leakage of hot gas from said gas pipe. Thus, the temperature increase is then an indication of leakage of hot gas from the gas pipe. As another example, wherein the arrangement is arranged to monitor heating systems, a temperature decrease may be related to malfunctioning of said heating systems. Thus, the temperature decrease is then an indication that the heating system is malfunctioning. The temperature range detectable by the arrangement 100 according to the present disclosure may range from −60° C. to 1200° C. depending on the type of optical fibre used in the arrangement.

According to one example, the arrangement 100 may comprise a user interface (190 in FIG. 1). The user interface 190 may be may be operatively connected to the detector (160 in FIG. 1) and/or to the processor (170 in FIG. 1). In one example, the arrangement 100 may be provided with means for wireless communication between the user interface 190 and the detector 160 and/or processor 170. The user interface may for example be a display, a computer or a mobile phone. The user interface may indicate a temperature increase, a temperature decrease and/or an absolute temperature along the optical fibre/the object to be monitored. In addition, the user interface may indicate in which part of the optical fibre 110 the temperature exceeds or falls below a predetermined temperature threshold value. In an example, the user device also indicates the absolute temperature. The user interface 190 may comprise a warning display and/or an audible alarm which indicates to a pilot or an operator that the temperature has exceeded the temperature threshold. Different temperature thresholds may be set for different parts of the optical fibre depending on what type of object that is monitored. For example, it may be accepted with smaller leakage of non-harmful gas, such as hot air, at some locations, whereas at other locations, for example along gas pipes comprising harmful gas, no leakage (i.e. corresponding to a temperature increase or temperature decrease) may be acceptable.

Figure 3:
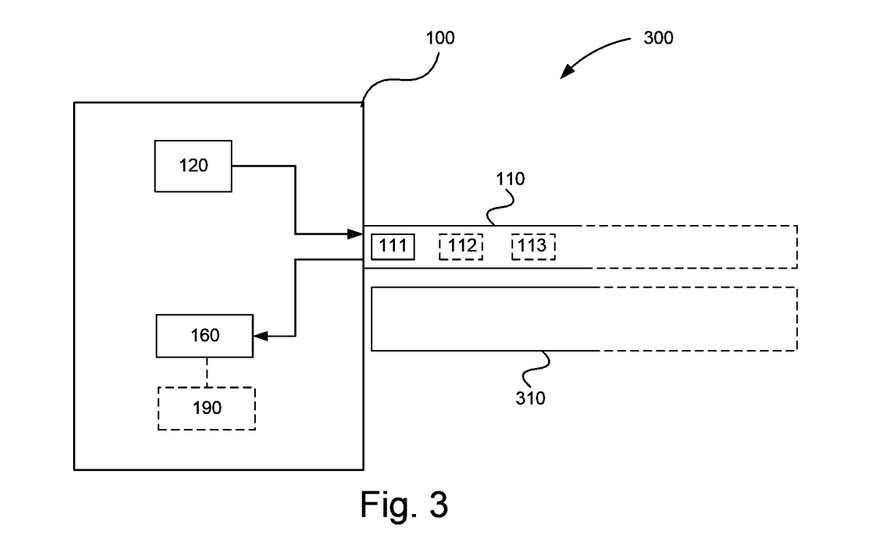
FIG. 3 schematically illustrates a system comprising an arrangement according to the present disclosure.

FIG. 3 schematically illustrates an example of a system 300 which comprises an arrangement 100 for obtaining a quantity relating to temperature along an optical fibre 110. The arrangement 100 comprises an optical fibre 110. The optical fibre 110 is provided at at least one location along the optical fibre with Fibre Bragg Gratings, FBGs, 111, 112, 113.

The optical fibre 110 is arranged along the part of an object 310 to be monitored. The object 310 to be monitored may for example be a gas pipe comprising hot gas. Such a pipe typically has a plurality of critical locations, where leakage is more likely to occur. For example, such critical location may be situated around a joint of the gas pipe. It may be advantageous to arrange the optical fibre 110 such that the parts with the FBGs are arranged adjacent to the critical locations. Hot gas is herein defined as a gas having a temperature ranging from 150° C. to 1200° C. In one example, the hot gas may be a non-harmful gas, such as hot air from ventilation systems. In another example, the hot gas may be harmful, such as combustion gases from the engines of the platform. Such combustion gases may be corrosive, toxic, flammable. As an alternative, the object 310 to be monitored may be a tank comprising a liquid. For example, it may be of interest to measure temperature in a fuel tank by extending the optical fibre 110 provided with FBGs 111, 112, 113 into the fuel tank.

Figure 4:
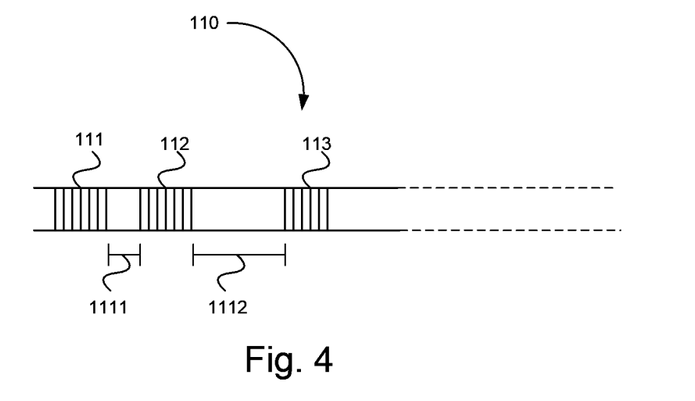
FIG. 4 schematically illustrates an optical fibre provided with Fibre Bragg Gratings, FBGs.

FIG. 4 schematically illustrates an optical fibre 110 provided with Fibre Bragg gratings, FBGs, 111, 112, 113. Each of the Fibre Bragg Gratings 111, 112, 113 is inscribed in a short segment of the optical fibre 110. The FBGs 111, 112, 113 are separated by portions 1111, 1112 where no FBGs are provided. Each of the Fibre Bragg Grating 111, 112, 113 is arranged to reflect light of a specific wavelength. The portions of the optical fibre 110 where no FBGs are provided are arranged to transmit the light but do not reflect any light. In one example, the optical fibre comprises a plurality of FBGs arranged along the optical fibre, thereby enabling obtaining a quantity relating to temperature at a plurality of different locations along the optical fibre. The reflectivity of the FBGs may depend on the type of optical fibre which is used in the arrangement.

The optical fibre 110 may have a length ranging from about 1 to 200 meter depending on its application. The optical fibre 110 is provided with FBGs along at a part of the optical fibre 110. The FBGs may be evenly or unevenly distributed along the optical fibre 110. As described above, it may be advantageous to arrange the parts of the optical fibre comprising FBGs adjacent to so-called critical locations, such as around a joint of the gas pipe, where leakage is more likely to occur. In one example, substantially the entire length of the optical fibre 110 is constituted of FBGs. In another example, the FBGs constitutes less than 50% or less than 25% of the total length of the optical fibre 110.

Each portion having FBGs may be of any suitable length, such as 10, 50 or 100 meters or more. Each FBG may have a length of about 10 mm. In one example, the optical fibre 110 has a length of 50 meters and the Fibre Bragg Gratings are separated by any suitable distance, such as 25 mm from the center of one FBG to the center of the subsequent FBG, resulting in an optical fibre comprising of about 2000 FBGs.

Each FBG is configured to at operational conditions reflect a specific part of the electromagnetic spectrum, wherein the peak in the reflected spectrum is called the Bragg wavelength. The wavelength range which the FBGs are arranged to reflect within depends on the type of optical fibre which is used. In one example, the FBGs of an optical fibre are arranged to reflect within a wavelength range of 1400-1600 nm. Typically, each FBG reflects within a wavelength range of about 10 nm. Hence, one FBG may be arranged to reflect light within a wavelength range of 1500-1510 nm and another FBG may be arranged to reflect light within a wavelength range of 1520-1530 nm and so on. In another example, the FBGs may be arranged to reflect light in the wavelength range of about 700-900 nm. The Bragg wavelength depends on the temperature of the Fibre Bragg Grating, whereby shifts in the Bragg wavelength can be translated to changes in temperature of the Fibre Bragg Grating.

In one example, the FBGs 111, 112, 113 may be repeatedly arranged in the optical fibre 110. This means that light of the same wavelength may be reflected at several different locations along the optical fibre 110. In such case, each FBG may have a relatively low reflectivity, such as 2%, whereby the so-called shadow effect becomes small and the temperature determination, i.e. the shift in wavelength is insignificantly disturbed.

Again, with reference to FIG. 1, the arrangement 100 comprises a light emitter 120. The light emitter 120 is typically arranged at one end of the optical fibre 110. The light emitter 120 is arranged to emit light, i.e. electromagnetic radiation of a predetermined wavelength into the optical fibre 110. The light emitter 120 is arranged to emit light comprising at least some the wavelengths that is reflected by at least some of the FBGs 111, 112, 113. The light emitting device 120 may for example be a superluminescent diode, a laser emitting device or a semiconductor optical amplifier. In one example, the arrangement may comprise of a separate light emitter 120. Alternatively, the first optical shutter 130 comprises the light emitter 120. The light emitter 120 may be arranged such that it emits light continuously. Alternatively, the light emitter 120 may be arranged to emit light at predetermined time intervals. In one example, the light emitter is controlled by the processor 170. Alternatively, the light emitter may be controlled by the control unit 180, a separate processor or by a switch (not shown).

The arrangement comprises a first optical shutter 130 and a second optical shutter 150. The first optical shutter 130 is arranged in the optical path after the light emitter 120, and in the optical path before the optical circulator 140. The second optical shutter 150 is connected to the optical circulator 140 and to the detector 160. Both the first optical shutter 130 and the second optical shutter 150 are connected to the control unit 180.

The first optical shutter 130 is arranged to be open or closed at a time and length which is coordinated with the opening and closing of the second optical shutter 150. When the first optical shutter is open, light emitted by the light emitter 120 is let through and into the optical fibre 110. The first optical shutter 130 may further be arranged to amplify the light emitted by the light emitter. In one example, the first optical shutter 130 comprises the light emitter 120, i.e. no separate light emitter is needed in the arrangement 100. Alternatively, the arrangement 100 comprises a separate light emitter 120 as shown in FIG. 1.

The second optical shutter 150 is arranged to be opened or closed at a time and length which is coordinated with the opening and closing of the first optical shutter 130. When the second optical shutter 150 is open, light from the optical circulator 140 is let through the second optical shutter 150 and thus to the detector 160. The second optical shutter 150 may further be arranged to amplify the light reflected by the FBGs 111, 112, 113. The purpose of the second optical shutter 150 is to control that that the light which was let through the first optical shutter 130 and which was reflected by the FBG in the optical fibre is received by the detector 160.

Both the first optical shutter 130 and the second optical shutters 150 have the function similar to a camera shutter, being opened either where light is let through the optical shutter, or closed where no light is let through the optical shutter. In addition, the first optical shutter 130 and/or the second optical shutter 150 may be arranged to amplify at least a first wavelength of the light passing through the first optical shutter 130 and/or at least said first wavelength of the light passing through the second optical shutter the light reflected from the FBGs. The amplification being performed by the second optical shutter 150 may be performed independently of the amplification being performed by the first optical shutter 130.

The time and length when the first optical shutter 130 is opened is coordinated with the second optical shutter 150 by the control unit 180. In one example, the light emitted by the light emitter may be let through for about 10 ns. In one example, the pulse frequency of the light let through by the first optical shutter and/or the second optical shutter may be in the range of one or more MHz.

Typically, there is a time delay such that the second optical shutter 150 is opened with a time delay as compared to the first optical shutter 130. By using a time delay between opening of the first optical shutter 130 and the opening of the second optical shutter 150 no reflections from light which has been emitted into the optical fibre earlier is received and mixed with the light reflected from the FBGs. In another example, the first optical shutter 130 and the second optical shutter 150 are simultaneously opened. If the first optical shutter 130 and the second optical shutter 150 are opened simultaneously and repetitively, a so-called delay line, i.e. an optical fibre arranged between the detector 160 and the first FBG of the optical fibre 110 is needed in order to avoid mixing of signals from different FBGs from light emitted from the light emitter at different times.

Each optical shutter may be active in a specific wavelength range. Typically, the first optical shutter 130 and the second optical shutter 150 are active within the same wavelength range. For example, the wavelength range of the first optical shutter 130 and the second optical shutter 150 may be in the range of 1500 to 1530 nm. In that case, if a FBG for example reflects light of a wavelength of 1520 nm at a temperature of 20° C. and the variation is about 0.01 nm per 1° C., the wavelength range of 1500 to 1530 nm of the first optical shutter 130 and the second optical shutter 150 covers the temperature range of that FBG.

The first optical shutter 130 and the second optical shutter may be the same type of component with the same functions. Alternatively, as mentioned above, the first optical shutter 130 may also comprise the light emitter 120. Alternatively, the first optical shutter 130 and/or the second optical shutter 150 may be different types of components, for example the first optical shutter 130 and/or the second optical shutter 150 may further be arranged to amplify at least a first wavelength of the light passing through the first shutter 130 and/or at least a said first wavelength of the light passing through the second shutter 150.

The first optical shutter 130 and the second optical shutter 150 are controlled by a common control unit 180. By the use of a common control unit 180 coordination between the first optical shutter 130 and the second optical shutter 150 is enabled. In one example, light is arranged to pass through the first optical shutter 130 and the second optical shutter 150 simultaneously. In another example, the first optical shutter 130 and the second optical shutter 150 are controlled by the control unit 180 such that light is arranged to pass through the second optical shutter 150 with a time delay as compared to when light is arranged to pass through the first optical shutter 130.

The control unit 180 may be arranged to control the timing of the opening and closing of the first optical shutter 130 and the second optical shutter 15, respectively. By "timing" is meant the time and the length of the time when an optical shutter is open. The control unit 180 may be a separate control unit, such as a pulse generator. Alternatively, the control unit 180 may be comprised within the processor 170. The control unit 180 is arranged such that it controls the first optical shutter to transmit light to the first FBG 111, to the subsequent FBG 112 and so on by adjustment of the opening and closing of the first optical shutter 130.

The control of the timing may be performed such that the light emitted into the optical fibre is allowed to travel from the first optical shutter 130 to the first FBG 111 where it is reflected and through the second optical shutter 150. The time for the light to travel from the first optical shutter 130 to the FBG 111 and through the second optical shutter 150 matches the chosen pulse repetition frequency (PRF). If the PRF is reduced, the second FBG 112 will correspond to the time for the light to travel from the first optical shutter 130 to the second FBG 112 and through the second optical shutter 150 instead and so on. Typically, the same PRF is used for a first group of FBGs which are located adjacent to one another, thereafter another PRF is used for a second group of FBGs which are located adjacent to one another etc.

As an alternative to varying the PRF is to generate a fixed PRF which controls the first optical shutter 130 and then generate a second pulse with a time delay as compared with the fixed PRF which controls the second optical shutter 150.

As mentioned above, the control of the timing may be performed by the control unit 180. The control unit 180 may be a programmable logic device (PLD), such as a Field Programmable Gate Array (FPGA).

The arrangement further comprises a detector 160. The detector is operatively connected to the second optical shutter 150. The detector 160 may further be operatively connected to a processor 170. The detector 160 is arranged to receive reflected light from the optical fibre 110 comprising FBGs 111, 112, 113. The detector is arranged to obtain a quantity related to temperature.

The detector may be a spectrometer with the ability to perform spectral analysis of the light reflected from the FBG patterns so as to determine a quantity related to temperature along the optical fibre 110 comprising the FBGs 111, 112, 113. As an alternative, the detector may comprise of one or a plurality of photodiodes, wherein each photodiode may be arranged to detect light reflected from the FBGs of a predetermined wavelength range.

The arrangement may optionally comprise a processor 170. The processor may be electrically connected to the detector 160. The processor 170 may be arranged to determine the absolute temperature at a location of the optical fibre comprising FBGs based on the light reflected from the FBGs and being received by the detector. The absolute temperature may be determined by analysing the spectral response from the optical fibre 110. As mentioned above, each FBG is configured to at operational conditions be active in a particular wavelength range within the electromagnetic spectrum and reflect a certain narrow wavelength band, within the particular wavelength range, depending on the temperature. The peak in the reflected spectrum is called the Bragg wavelength. The Bragg wavelength depends on the temperature of the FBG, whereby a shift in the Bragg wavelength/spectrum as compared to a reference spectrum of Bragg wavelength can be translated to changes in temperature of the FBG, such as a temperature increase/temperature decrease. Reference Bragg wavelengths corresponding to a specific temperature may be stored in a storage unit (not shown) in the processor (180). In a further example, the storage unit may store a number of reference values corresponding to Bragg wavelengths which is used in order to calibrate the arrangement. By comparing the detected Bragg wavelength with the reference Bragg lengths an absolute temperature may be calculated/determined by the processor.

Since each FBG is configured to at operational conditions reflect a specific part of the electromagnetic spectrum and by knowing where each specific FBG is located within the optical fibre, it may be possible to determine a location of the optical fibre/object to be monitored, where the parameter change has occurred. In another example, by performing a combined wavelength division multiplexing and time division multiplexing by means of the processor it may be determined which unique FGB is subjected to a temperature change. By the choice of pulse repetition frequency of the opening and closing of the (alternatively by the delay of the opening of the first optical shutter 130 as compared to the opening of the second optical shutter 150), the approximate distance to a FBG is known. By combining the approximate distance to the FBG with the wavelength reflected from the FBG, it is possible to determine exactly which FBG that has reflected the light, i.e. to determine the position of the optical fibre where a temperature change has arisen. Typically, it is known how the FBGs are arranged along the fibre. By then performing a combined wavelength division multiplexing and time division multiplexing by means of the processor it may be determined which unique FGB is subjected to a parameter change, e.g. a pressure change, strain change, or other. Thereby it is possible to determine a location of the optical fibre/object to be monitored, where the parameter change has occurred. The processor may be able to convert the temperature change into a change of another parameter such as pressure, thereby enabling detecting a pressure change by the optical fibre. In one example, the processor may be arranged to control the light emitter 120. In yet another example, the processor may be arranged to communicate with and/or to control the control unit 180.

In one example, the processor 170 may comprise a storage unit (not shown). The storage unit may store data regarding all of the different Fibre Bragg Gratings 111, 112, 113. For example, the data may relate to identification of each of the FBGs 111, 112, 113 within the optical fibre 110, such as the wavelength range within the electromagnetic spectrum in which a FBG is active in, and the location of a FBG. The storage unit may also store the threshold values of temperatures set at locations along the optical fibre. Further, the storage unit may store data regarding how the temperature affects the reflected wavelength for each of the Fibre Bragg Gratings 111, 112, 113 and may be used for calibration of the arrangement.

The arrangement further comprises an optical circulator 140 which is arranged to direct light to different parts of the optical fibre 110. The optical circulator 140 is operatively connected to the first optical shutter 130 at the first port, to the part of the optical fibre comprising FBGs 111, 112, 113 at the second port, and to the second optical shutter 150 at the third port.

The optical circulator 140 is an optical device provided with a number of ports, arranged such that light entering a port of the optical circulator exits from the next port. This means that if the light enters the first port it exits from the second port, if the light enters the second port it exits from the third port etc. Hence, if some light which has exit the second port is reflected back to the circulator, it does not exit from the first port, instead it exits from the third port. The purpose of the optical circulator is to separate optical signals that travel in opposite directions in the optical fibre 110. The circulator 140 in the arrangement 100 shown in FIG. 1 has tree ports.

Figure 5:
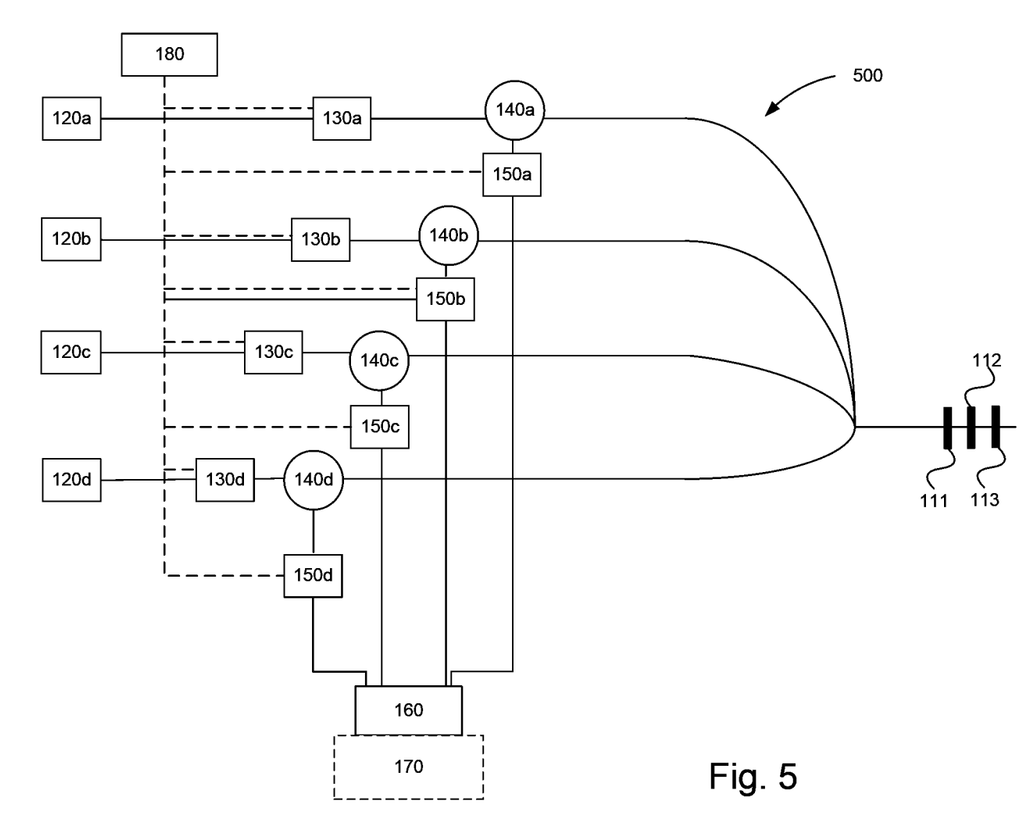
FIG. 5 schematically illustrates an architecture comprising a plurality of arrangements according to the present disclosure.

In FIG. 5, an architecture 500 comprising a plurality of arrangements 100 according to the present disclosure is shown. As mentioned above, each optical shutter is active in a specific wavelength range. Hence, by linking together a number of arrangements comprising optical shutters which each are active in a specific wavelength range, it may be possible to monitor a wider wavelength range as compared the wavelength range possible to monitor by one single arrangement 100. In one example, the architecture 500 may have a common control unit 180 which is arranged to control all of the optical shutters 130*a*, 130*b*, 130*c*, 13*d*; 150*a*, 150*b*, 150*c*, 150*d*. Alternatively, each arrangement in the architecture comprises a control unit. In one example, the architecture 500 may have a common detector 160. Alternatively, each arrangement in the architecture comprises a detector. Optionally, the architecture 500 has a common processor 170.

Figure 6:
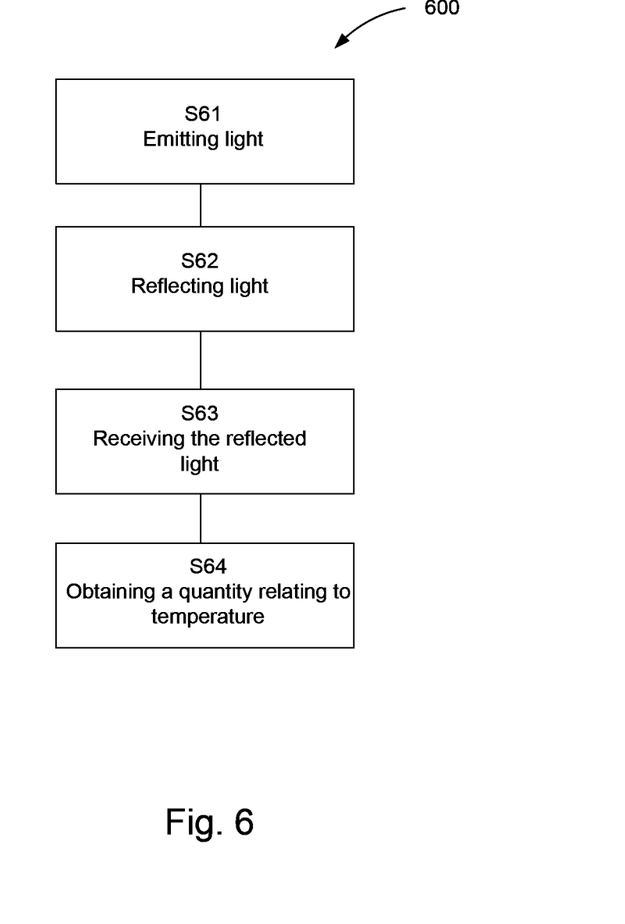
FIG. 6 is a flow diagram illustrating a method according to the present disclosure.

It is herein depicted that the proposed arrangement 100 and method 600 are arranged to obtaining a quantity related to temperature along a part of the optical fibre 110. It should however be noted that the proposed arrangement and method are applicable to monitor a number of other parameters, such as strain, vibration or pressure. When another parameter than temperature is monitored, the processor 170 may be arranged to process the quantity related to temperature in order to convert it into the other parameter.

FIG. 6 illustrates the method steps of a method 600 for obtaining a quantity related to a temperature along a part of an optical fibre 110 by means of the arrangement 100. The arrangement comprises a light emitter 120, a detector 160, a first optical shutter 130, a second optical shutter 150, a control unit 180 and an optical circulator 140. The method 600 comprises emitting S61 light into the optical fibre, wherein the optical fibre is provided with Fibre Bragg Gratings, FBGs 111, 112, 113. The method then comprises reflecting S62 light within a predetermined wavelength range by the FBGs, receiving S63 the reflected light by the detector, and obtaining S64 a quantity related to temperature. The control unit 180 is arranged to coordinate the timing of the opening and closing of the first optical shutter 130 and of the second optical shutter 150 in order to let the light emitted by the light emitter 120 through the first optical shutter 130, and to let the light reflected by the FBGs through the second optical shutter 150.

It is herein also depicted a computer program product comprising a non-transitory computer-readable storage medium having thereon a computer program comprising program instructions. The computer program is loadable into the processor and configured to cause the processor to carry out steps of the method for obtaining a quantity related to a temperature along at least a part of an optical fibre. The method comprises the steps of emitting light by the light emitter into the optical fibre, the optical fibre being provided with Fibre Bragg Grating, reflecting light within a predetermined wavelength range by the FBGs. The method further comprises receiving the reflected light by the detector, obtaining, based on the reflected light received by the detector, a quantity related to temperature. The control unit is arranged to coordinate the timing of the opening and closing of the first optical shutter and of the second optical shutter in order to let light through.

The invention claimed is:

1. An arrangement (100) for obtaining a quantity related to a temperature along a part of an optical fibre (110), said arrangement comprising:
   a light emitter (120) arranged to emit light into the optical fibre (110), wherein the optical fibre at least one location along said part of the optical fibre is provided with a Fibre Bragg Gratings, FBGs (111, 112, 113), said FBGs being arranged to reflect light within a predetermined wavelength range,
   a first optical shutter (130) arranged in the optical path after the light emitter, said first optical shutter being arranged to be open and closed in order to let the emitted light through and into the optical fibre (110),
   a second optical shutter (150) arranged to be opened and closed in order to let the reflected light through,
   a detector (160) arranged directly after the second optical shutter (150) to receive and detect the reflected light,
   an optical circulator (140) having a first, a second and a third port, the optical circulator being operatively connected to the first optical shutter (130) at the first port, to the part of the optical fibre provided with the FBGs (111, 112) at the second port, and to the second optical shutter (150) at the third port, and
   a control unit (180) arranged to control the first optical shutter (130) and the second optical shutter (150), wherein the control unit (180) is arranged to coordinate the timing of the opening of the first optical shutter (130) and the second optical shutter (150), respectively.

2. The arrangement (100) according to claim 1, wherein the first optical shutter (130) and/or the second optical shutter (150) is further arranged to amplify at least a first wavelength of the light passing through the first shutter (130) and/or at least said first wavelength of the light passing through the second shutter (150).

3. The arrangement (100) according to claim 1, wherein the first optical shutter (130) comprises the light emitter (120).

4. The arrangement (100) according to claim 1, wherein the first optical shutter (130) and the second optical shutter (150) are controlled by the control unit (180) such that the first optical shutter (130) and the second optical shutter (150) are opened simultaneously.

5. The arrangement (100) according to claim 1, wherein the first optical shutter (130) and the second optical shutter (150) are controlled by the control unit (180) such that the second optical shutter (150) is opened with a time delay as compared to when the first optical shutter (130) is opened.

6. The arrangement (100) according to claim 1, further comprising a user interface (190) operatively connected to the detector (160) and/or the processor (170), said user interface being arranged to present information relating to the temperature along a part of the optical fibre.

7. The arrangement (100) according to claim 1, wherein the first optical shutter (130) and/or the second optical shutter (150) is a semiconductor optical amplifier, SOA.

8. The arrangement (100) according to claim 1, wherein the light emitter (120) is a superluminescent diode or a laser emitting device.

9. The arrangement (100) according to claim 1, wherein the optical fibre comprises a plurality of FBGs (111, 112, 113) arranged along the optical fibre for obtaining a quantity relating to temperature at a plurality of different locations along the optical fibre.

10. The arrangement (100) according to claim 1 further comprising a processor (170) operatively connected to the detector (160), said processor being arranged to process the detected light in order to determine the quantity related to temperature, such as a temperature of the optical fibre (110).

11. The arrangement (100) according to claim 10, wherein the processor is further arranged to determine a location along the optical fibre (110) from which the detected light has been reflected.

12. A system (300) for detecting gas leakage from a gas pipe, said system comprising an arrangement according to claim 1 and said gas pipe.

13. A platform (200) comprising an arrangement according to claim 1.

14. The platform (200) according to claim 13, wherein the platform comprises a gas pipe arranged to carrying hot gas and wherein the part of the optical fibre provided with the FBGs is arranged along the gas pipe.

15. A method (600) for obtaining a quantity related to a temperature along at least a part of an optical fibre (110), the method comprising the steps of:
   providing an arrangement comprising a light emitter (120), a first optical shutter (130), an optical circulator (140), a second optical shutter (150), a detector (160) arranged directly after the second optical shutter (150), and a control unit (180),
   emitting (S61) light by the light emitter into the optical fibre, the optical fibre being provided with Fibre Bragg Grating,
   reflecting (S62) light within a predetermined wavelength range by the FBGs,
   receiving (S63) the reflected light by the detector, and
   obtaining (S64), based on the reflected light received by the detector, a quantity related to temperature,
   wherein the control unit (180) is arranged to coordinate the timing of the opening and closing of the first optical shutter (130) and of the second optical shutter (150) in order to let light through.

16. A computer program product comprising a non-transitory computer-readable storage medium having thereon a computer program comprising program instructions, the computer program being loadable into a processor (170) and configured to cause the processor (170) to obtain a quantity related to a temperature along at least a part of an optical fibre (110), the method comprising the steps of:
   providing an arrangement comprising a light emitter (120), a first optical shutter (130), an optical circulator (140), a second optical shutter (150), a detector (160) arranged directly after the second optical shutter (150), and a control unit (180),
   emitting (S61) light by the light emitter into the optical fibre, the optical fibre being provided with Fibre Bragg Grating, reflecting (S62) light within a predetermined wavelength range by the FBGs,
receiving (S63) the reflected light by the detector, and
obtaining (S64), based on the reflected light received by the detector, a quantity related to temperature,
wherein the control unit (180) is arranged to coordinate the timing of the opening and closing of the first optical shutter (130) and of the second optical shutter (150) in order to let light through.

\* \* \* \* \*